US006687008B1

(12) United States Patent
Peale et al.

(10) Patent No.: US 6,687,008 B1
(45) Date of Patent: Feb. 3, 2004

(54) WAVEGUIDE BASED PARALLEL MULTI-PHASESHIFT INTERFEROMETRY FOR HIGH SPEED METROLOGY, OPTICAL INSPECTION, AND NON-CONTACT SENSING

(75) Inventors: David Peale, Tinton Falls, NJ (US); Carlos Duran, San Diego, CA (US); Harald Hess, La Jolla, CA (US)

(73) Assignee: KLA-Tencor Corporation, San Jose, CA (US)

( * ) Notice: Subject to any disclaimer, the term of this patent is extended or adjusted under 35 U.S.C. 154(b) by 192 days.

(21) Appl. No.: 09/694,849

(22) Filed: Oct. 19, 2000

(51) Int. Cl.[7] .................................................. G01B 9/02
(52) U.S. Cl. ...................................................... 356/477
(58) Field of Search ................................ 356/477, 482; 250/227.19, 227.27, 12; 385/12

(56) References Cited

U.S. PATENT DOCUMENTS

| 3,985,447 | A | | 10/1976 | Aspnes |
| 4,180,830 | A | | 12/1979 | Roach |
| 4,293,224 | A | | 10/1981 | Gaston et al. |
| 4,346,996 | A | | 8/1982 | Miller |
| 4,552,457 | A | | 11/1985 | Giallorenzi et al. |
| 4,554,460 | A | | 11/1985 | Klein |
| 4,593,368 | A | | 6/1986 | Fridge et al. |
| 4,630,926 | A | | 12/1986 | Tanaka et al. |
| 4,632,554 | A | | 12/1986 | Pearce |
| 4,724,314 | A | | 2/1988 | Caimi |
| 4,753,529 | A | * | 6/1988 | Layton .................. 250/227.27 |
| 4,777,544 | A | | 10/1988 | Brown et al. |
| 4,794,264 | A | | 12/1988 | Quackenbos et al. |
| 4,794,265 | A | | 12/1988 | Quackenbos et al. |
| 4,813,782 | A | | 3/1989 | Yagi et al. |
| 4,832,487 | A | | 5/1989 | Mikuriya et al. |
| 4,841,389 | A | | 6/1989 | Hoyt et al. |
| 4,844,616 | A | | 7/1989 | Kulkarni et al. |
| 4,866,593 | A | | 9/1989 | Miura et al. |
| 4,872,071 | A | | 10/1989 | Easton et al. |
| 4,942,609 | A | | 7/1990 | Meyer |
| 5,037,204 | A | * | 8/1991 | Poisel et al. ................. 356/466 |
| 5,105,451 | A | | 4/1992 | Lubinsky et al. |
| 5,127,731 | A | | 7/1992 | DeGroot |
| 5,168,413 | A | | 12/1992 | Coker et al. |
| 5,185,643 | A | | 2/1993 | Vry et al. |
| 5,280,340 | A | | 1/1994 | Lacey |
| 5,305,330 | A | | 4/1994 | Rieder et al. |
| 5,313,266 | A | * | 5/1994 | Keolian et al. ........ 250/227.19 |

(List continued on next page.)

FOREIGN PATENT DOCUMENTS

JP  2-156105  6/1990

OTHER PUBLICATIONS

A. Nigam, "A Visible Laser Interferometer for Air Bearing Separation Measurement to Submicron Accuracy," Excerpt from Transaction of the ASME; Jan. 1982, pp. 60–65, vol. 104.

(List continued on next page.)

Primary Examiner—Robert H. Kim
Assistant Examiner—Richard Kim
(74) Attorney, Agent, or Firm—Irell & Manella LLP

(57) ABSTRACT

An interferometer that contains a tri-coupler to mix light from three different waveguides. The light is emitted from a light source and may be reflected from a test surface. The output of the tri-coupler may be three different light beams that have intensities 120 degrees out of phase from each other. The out-of-phase light beams may be detected by a plurality of photodetectors. The detected out-of-phase light beams may be used to determine a height of the test surface. The waveguides and tri-coupler provide a compact and relatively inexpensive interferometer.

7 Claims, 4 Drawing Sheets

U.S. PATENT DOCUMENTS

| | | |
|---|---|---|
| 5,371,588 A | 12/1994 | Davis et al. |
| 5,410,439 A | 4/1995 | Egbert et al. |
| 5,412,519 A | 5/1995 | Buettner et al. |
| 5,504,571 A | 4/1996 | Eckerman et al. |
| 5,557,399 A | 9/1996 | De Groot |
| 5,583,639 A | 12/1996 | Rostvall |
| 5,594,595 A | 1/1997 | Zhu |
| 5,661,559 A | 8/1997 | Brezoczky et al. |
| 5,673,110 A | 9/1997 | Erickson et al. |
| 5,777,737 A * | 7/1998 | Priest .................. 356/73.1 |
| 5,777,740 A | 7/1998 | Lacey et al. |
| 5,793,480 A | 8/1998 | Lacey et al. |
| 5,831,781 A | 11/1998 | Okamura |
| 5,883,714 A | 3/1999 | Jann et al. |
| 5,995,211 A * | 11/1999 | Mueller et al. ............ 356/73.1 |
| 6,097,486 A * | 8/2000 | Vakoc et al. ................ 356/477 |
| 6,163,632 A * | 12/2000 | Rickman et al. ............ 356/459 |
| 6,445,455 B1 * | 9/2002 | Hall et al. .................. 356/460 |

OTHER PUBLICATIONS

Muranushi, et al. "Estimation of the Zero–Spacing Error Due to a Phase Shift of Reflected Light in Measuring a Magnetic Head Slider's Flying Height by Light Interfernece," American Society of Mechanical Engineers; 1992, pp. 371–379, vol. 4.

Lacey, et al., "A New Method for Measuring Flying Height Dynamically," IDEMA's Diskcon '92: Technical Proceedings; Sep. 23, 1992.

K. Brudewski, "Static Stokes Ellipsometer: General Analysis and Optimization," Journal of Modern Optics, 1991, pp. 889–896, vol. 38, No. 5.

"Component Integration," Excerpt from Data Storage on Rigid Disks; pp. 103–129.

Bonyhard, et al. "A theory of Digital Magnetic Recording on Metallic Films," IEEE Transactions on Magnetics; Mar. 1996, vol. Mag.–2, No. 1.

* cited by examiner

FIG. 3 PRIOR ART
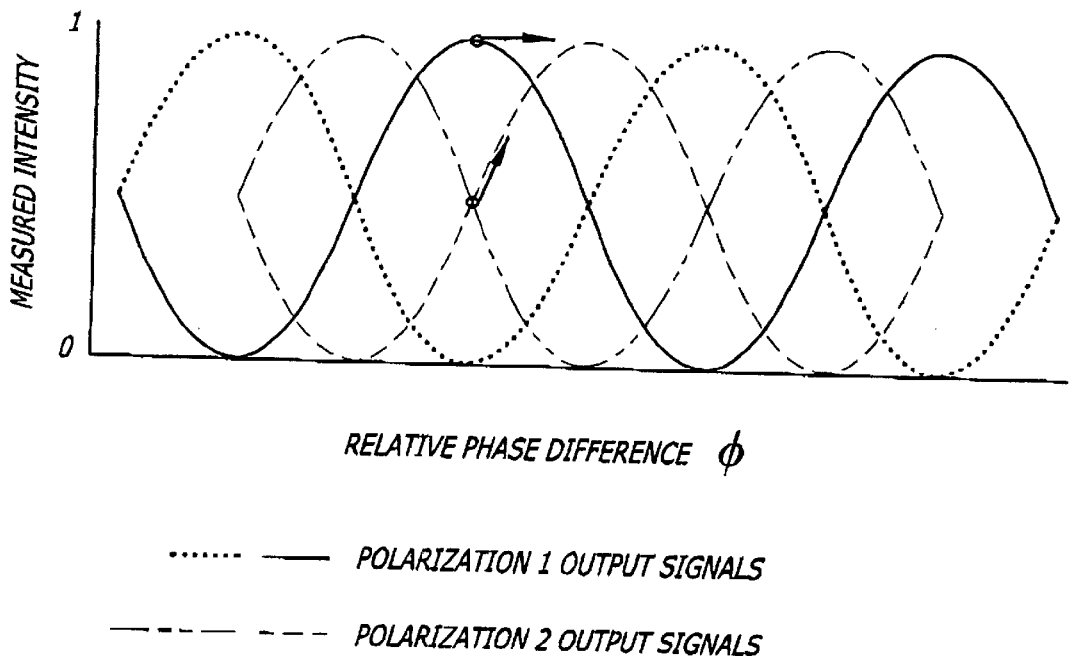
·········· ———— POLARIZATION 1 OUTPUT SIGNALS
— — — — — — — POLARIZATION 2 OUTPUT SIGNALS
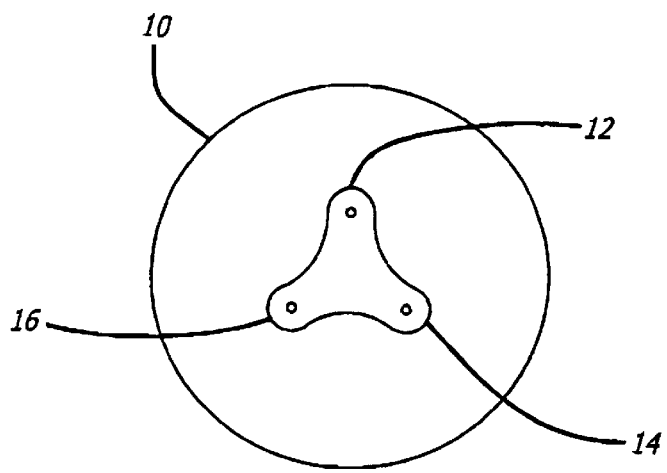
FIG. 4

WAVEGUIDE BASED PARALLEL MULTI-PHASESHIFT INTERFEROMETRY FOR HIGH SPEED METROLOGY, OPTICAL INSPECTION, AND NON-CONTACT SENSING

BACKGROUND OF THE INVENTION

1. Field of the Invention

The present invention relates to an interferometer that contains waveguides and a 3×3 directional coupler.

2. Background Information

Interferometers are often employed in metrology, remote sensing, and process control applications in which the property or process parameter of interest is encoded as a phase shift between a sample and reference optical beam.

For example, in the disk drive industry, determining the microscopic topology of a disk surface at various stages during production is becoming an increasingly important factor in estimating the likelihood of producing a favorable quality disk. Cost pressures are increasingly forcing manufacturers to weed out unviable disks at earlier stages of production. Given the very high density of data stored on such disks, topographic profiles with heights ranging from less than 1 nm to tens of microns must be monitored at a lateral resolution on the order of 1 micron. Given the throughput of disks required for cost effective use of capital, a disk should be inspected in a period on the order of 10 seconds to 1 minute. This means that the inspection apparatus would need an effective data collection rate on the order of 100 to 600 MHz to inspect one side of a 95 mm diameter disk. The technical challenge is then to produce a very sensitive, high speed interferometric system that has a wide dynamic range. The system should also be accurate, compact, reliable, and cost effective.

Fundamentally, interferometers are devices which convert the phase difference between two input waves into intensity variations on one or more output waves which carry information about the phase difference between the input waves. The interferometer outputs are superpositions of portions of the two input waves. The amount of each input delivered to each output, and the phase shift imparted during delivery determines the characteristics of the interferometer.

For example, in the canonical interferometer employing a beamsplitter as shown in FIG. 1, two input beams with electric field magnitudes Ea and Eb are each split into two components of equal magnitude by the beamsplitter. However because of the reflections at the interface within the beamsplitter, the phase of the component which is reflected in the beamsplitter is shifted 90 degrees with respect to the phase of the component which is transmitted. The two key properties of this interferometer that determine its operational characteristics are i) that the inputs are split into equal magnitude components, and ii) that the phase shift imparted to one of those components is 90 degrees.

The consequences of this interferometer's properties may be seen by inspecting the results of the math describing these properties:

input beam 1: $E_a\, e^{i((w)t)}$
input beam 2: $E_b\, e^{i(wt+\emptyset)}$
ouput beam 1: ½ ($E_a\, e^{i(wt)} + E_b\, e^{i(wt+\emptyset-\pi/2)}$)
ouput beam 2: ½ ($E_a\, e^{i(wt-\pi/2)} + E_b\, e^{i(wt+\emptyset)}$)

Here, w is the optical frequency of the light beams, $\emptyset$ is the phase relation between input beam 1 and 2, and $\pi/2$ represents the 90 degree phase shift incurred by the reflection within the beamsplitter.

The intensities of the two output beams are proportional to the magnitude squared of their component electric fields, so the measurable intensities of the two beams are:

output beam 1:=½ ( $E_a^2+E_b^2+2\, E_a\, E_b\, \sin(\emptyset)$)
output beam 2:=½ ( $E_a^2+E_b^2-2\, E_a\, E_b\, \sin(\emptyset)$)

These equations are the canonical equations describing interference between two waves, and are illustrated in FIG. 2 where $E_a=E_b$. The intensity of each measured output beam is sinusoidally modulated from minimum to maximum as a function of the relative phase difference $\emptyset$ between the two input beams. Also, the second output beam is modulated in exact opposition with respect to beam 1.

Together, the combined intensity of the two beams conserves the combined intensity of the input beams, but aside from this, the phase information in the second output beam is entirely complementary to the phase information carried in the first beam. In this sense, the second beam provides only redundant information about the phase $\emptyset$. The fact that the second output is modulated in exact opposition to the first is a direct consequence of the property of the beamsplitter that imparted a 90 degree phase shift on the reflected beam components. It is not a fundamental aspect of interferometry or of a generalized interferometric apparatus.

As simple as this canonical interferometer is, it has a number of undesirable characteristics, the foremost being that the output intensity, which carries the phase information between the input beams, is bounded and periodic while the input phase difference is not. Consequently, as the intensities of both output beams reach their respective minima or maxima, the sensitivity of the interferometer to changes in the input phase-difference drops to zero. Said another way, the sensitivity of the interferometer is proportional to the slope of the intensity vs. phase-difference relation. Since the slope goes to zero at the maxima and minima, the sensitivity drops to zero there. Not only is it undesirable to have variable sensitivity, but the complete null in sensitivity leads to an inability to unambiguously track phase-difference excursions beyond $\pm\pi/2$ from the point of maximum sensitivity. A reversal in the progress of a phase-difference occurring within the blind region of the interferometer could not be discerned from a continuation of the phase-difference into the next order.

The limitations of this canonical "homodyne" interferometer are widely recognized, and a number of methods have been developed to bypass these limitations. Chief among the methods used is the Doppler, or heterodyne, interferometer. In this form of an interferometric device, the same form of beamcombining described above may be used to combine the two test beams, however one of the beams to be interfered has had its frequency shifted with respect to the other beam (for example by the use of an acoustic-optic modulator or by using a dual-frequency laser). Because of this, when the two input beams are interfered, the optical frequency does not completely drop out of the equations describing the intensity-modulated output. Instead, the output intensity is modulated at the frequency shift employed (typically 10–50 MHz). Stated differently, the output appears to register a constantly increasing phase difference between the two input beams. In this way, an externally induced phase shift between the beams is detected as a momentary change in the rate of phase advance of the output intensities.

The advantages of Doppler interferometers include an ability to unambiguously detect phase shifts in either direction as well as shifts over ranges exceeding one interferometric order. Disadvantages of Doppler interferometers include the increased complexity since a dual frequency source must be used, and the additional RF electronic stages that are needed to track the phase of the detected signal. Furthermore, the rate of phase shift that can be tracked with a Doppler interferometer is limited by the frequency shift employed and the degree of filtering used in the phase detection electronics. A tradeoff between tracking speed and minimum detectable motion is required because of this. It is therefore impossible to detect very slow motions (e.g. small displacements with short periods) with high bandwidth. Likewise, very high speed motions can only be detected with limited accuracy. In no case should the rate of phase shift exceed the bias phase shift rate set by the frequency offset between the two beams. This places an upper limit on the the rate of phase shift between the two input beams (i.e. the speed of an object or surface being measured) which can be tracked by heterodyne interferometry. For light at 632 nm with a frequency bias of 50 MHz, this limit is 30 meters/second with practical values of 10 m/s being more typical.

Also used as a means of circumventing the drawbacks of the canonical interferometer is a homodyne interferometer which uses orthogonally polarized test beams to produce two sets of output signals modulated quadrature with each other as shown in FIG. 3. This may be done using free-space or fiber optics as described in U.S. Pat. No. 5,663,793 issued to de Groot and U.S. Pat. No. 5,323,258 issued to Tsushima et al. In this way, when one pair of output signals is at their sensitivity null, the second pair of signals is at their sensitivity maximum. Aggregate sensitivity is therefore prevented from dropping to zero over the full period of input phase shifts. Also, the fact that output signals appear in quadrature allows the phase reversal ambiguity to be overcome. When one signal pair is at an ambiguity point (as illustrated in FIG. 3), the quadrature signals have clear slopes which indicate the direction of the phase shift advance.

Polarization sensitive homodyne interferometers also have drawbacks. One such drawback is again the increased complexity of the device due to the use of additional polarization beamsplitters and wave plates. Furthermore, great care must be used to prevent stray backreflections from the surfaces of these many components. Such backreflections produce interferometric noise which degrades the measurement accuracy. Also, care must be exercised to prevent birefringence in the system which could cross-couple the two independent polarizations and confuse interpretation of the detected signals.

Yet another method which bypasses the problems of the canonical interferometer is the multiphase approach as described in U.S. Pat. No. 5,392,116 issued to Makosch. In this method, orthogonally polarized beams are again created and used to carry the sought-after phase information (which was imparted to the beams by height differences between two points on a sample surface). However, instead of creating just two pairs of interfering beams using separate beamsplitters, a diffraction grating is used to create 5 pairs of beams via the 0th, ±1st and ±2nd diffraction orders. A special phase shifter element is used to impart predetermined phase delays onto the orthogonally polarized components of the diffracted orders so that when they are interfered, five sets of quadrature signals are produced. It is claimed in the '116 patent that the multiplicity of quadrature signals improves the accuracy of the measurement. It is also claimed that this method is preferred over the three phase, time-sequenced measurement technique described in U.S. Pat. No. 4,298,283 issued to Makosch et al.

While the Makosch approach represents a more compact and accurate implementation of homodyne quadrature interferometry, it is still relatively complicated and expensive to construct. In particular, great care must be exercised in fabricating the special phase shifting element. Care is also needed when aligning the multiple beams to produce overlap for suitable interference to take place.

U.S. Pat. No. 5,875,029 issued to Jann et al. discloses an interferometric surface inspection apparatus that reflects a reference light beam from an inclined reference surface and an object light beam from a disk surface. The beams are then interfered to create a multifringe spatial interference pattern. This pattern is split by a prism and directed towards three separate photodetectors. In front of each photodetector is a mask pattern, referred to as a "ruling", which either blocks or transmits the light of the interference pattern depending on the spatial location of the fringes of the interference pattern. By orienting the positions of the masks with respect to the interference fringes, the signals at the detectors can be brought into a quadrature relation which can give the interferometer null-free sensitivity. The signals can then be used to compute variations in the height of a storage disk surface.

As follows from the limitations of all these previous approaches, there is still a need in the art for a simple, compact and relatively inexpensive interferometric measuring technique that is accurate, has no sensitivity dropouts, or ambiguity points, is easy to construct and free of critical alignment requirements.

Of relevance to the present invention is U.S. Pat. No. 4,732,447 issued to Wright et al. Disclosed in the '447 patent is a homodyne optical coherent receiver for communication systems which is phase insensitive. The receiver is based on a multiport optical coupler., and in the case of 3 ports, uses the 120 degree phase separation between the light beams in the 3-port coupler to effect a more robust receiver. The '447 patent however does not discuss the advantage of the 3-port coupler as a means for accurately determining the phase-difference between the input beams or suggest its use for metrological applications.

Also of relevance to the present invention is U.S. Pat. No. 5,313,266 issued to Keolian et. al. The '266 patent discloses an interferometer sensor comprising, among other things, a first coupler for splitting a source into two beams, a second coupler which produces three phase modulated signals x, y, and z, and a symmetric demodulator circuit for converting the set of three electrical signals a, b, and c into a single electrical signal which is proportional to the signal of interest. The application specified in the patent covers hydrophone signal demodulation, and the emphasis of the patent is on the method of symmetric demodulation as accomplished by the algorithm and analog circuitry described therein.

The '266 patent specifically references articles in the scientific literature which describe the important characteristics of the 3×3 coupler which makes it useful for interferometric applications. In these articles, the specific application discussed was that of a fiber gyroscope. These articles includes Sheem, "Fiberoptic Gyroscopes with 3×3 Directional Coupler", Appl. Phys. Lett., 37(10), pp. 869–871, Nov. 15, 1980; and, Sheem, "Optical Fiber Interferometers with 3×3 Directional Couplers", in J. Appl. Phys., 52 (6), pp.3865–3872, June 1981.

SUMMARY OF THE INVENTION

One embodiment of the present invention is an interferometer that contains a tri-coupler to mix light from three different waveguides. The light is emitted from a light source and may be reflected from a test surface. The output of the tri-coupler may be three different light beams that have intensities 120 degrees out of phase from each other. The out of phase light beams may be detected by a plurality of photodetectors. The detected out of phase light beams may be used to determine a height of the test surface.

BRIEF DESCRIPTION OF THE DRAWINGS

FIG. 3 illustrates the output intensities of a quadrature interferometer of the prior art;

FIG. 4 is a schematic cross-sectional view at some point along the length of a fiber optical tri-coupler such as used in the interferometer;

DETAILED DESCRIPTION

Figure 1:
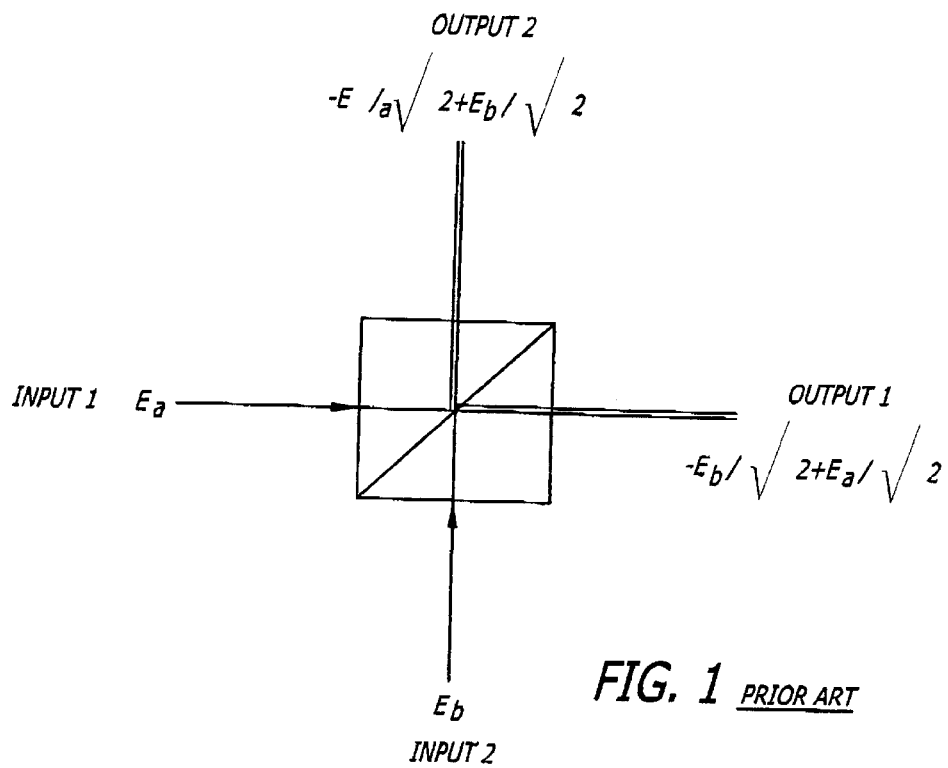
FIG. 1 illustrates the canonical interference arrangement of the prior art using a beamsplitter with two input beams and two output beams.
Figure 2:
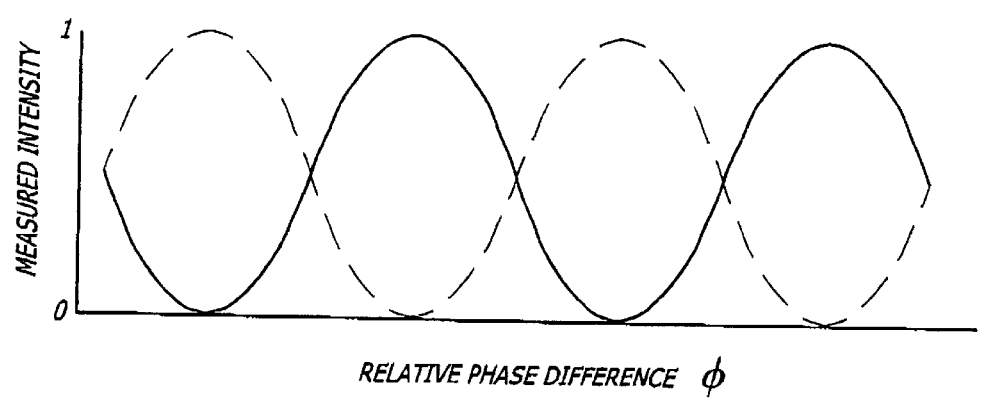
FIG. 2 illustrates the intensities of the output beams vs. input phase-difference for the canonical interferometer of the prior art.

In the embodiment comprising an optical interferometer for metrological applications, the present invention improves upon all of the above mentioned embodiments by employing waveguided optics and an optical coupler which we refer to as a tri-coupler. The tri-coupler consists of three waveguide inputs and three waveguide outputs and a region in between in which the waves from each of the three inputs are redistributed approximately equally to each of the three outputs. If one assumes that the tri-coupler is lossless and distributes light from an input waveguide equally to each of the three output waveguides, then it is possible to prove that there must be a 120 degree phase shift between each of the three output light waves. As a consequence of this, if light is injected into two of the input waveguides, then the intensity of the light in the three output waveguides will possess a periodic interferometric modulation as the phase difference between the input beams is advanced, and in particular, the phase relation among the intensities of these three beams will be 120 degrees. Because of this, it is possible to measure the intensities of the three output beams, and accurately determine the phase difference between the two input beams. In addition, the total intensity of the input light can also be calculated.

Because the three output intensities are phase-separated by 120 degrees, the interferometer of the present invention has no point of null sensitivity. Furthermore, this advantageous phase relation is achieved using only one input polarization state; there is no need to create separate orthogonally polarized beams in order to obtain quadrature signals or the advantages thereof. A well made tri-coupler will produce the desired 120 degree phase relation with any polarization input. This leads to a further advantage of the tri-coupler interferometer which is its simplicity and compactness. As mentioned above, the advantageous 120 degree phase relation is created without the use of polarizing beamsplitters or additional phase shifters, so the number of optical components required is significantly reduced. This greatly reduces the cost of the system. In addition, an optical tri-coupler is quite compact (typically measuring 0.12" diameter by 2" in length), and requires no alignments or adjustments in order to produce the desired interferometric properties.

One embodiment of the present invention is an optical interferometer employing a tri-coupler in which each of the two light waves to be phase-compared are injected into a separate input waveguide of the tri-coupler (the third input waveguide receives no input signal), and the output waveguides are fed to detectors which record the intensity of the three outputs. These intensity readings are then fed to a computing device which accurately calculates the phase difference between the input beams. The calculation includes certain calibration routines which allow the slight imperfections and nonuniformities in the coupler, waveguides, and detectors to be accounted for during the calculation thereby increasing the accuracy of the measurement.

Referring to the drawings more particularly by reference numbers, FIG. 4 is a schematic cross section through one section of a fused-fiber optical tri-coupler 10 showing the spatial symmetry of the three fibers 12, 14 and 16 which leads to the characteristic 120 degree phase relation between the light waves within each of the three waveguides. The tri-coupler 10 couples light between the first 12, second 14 and third 16 waveguides such that light input at one end of any waveguide is substantially equally distributed to each of the three waveguides at the output end.

Figure 5:
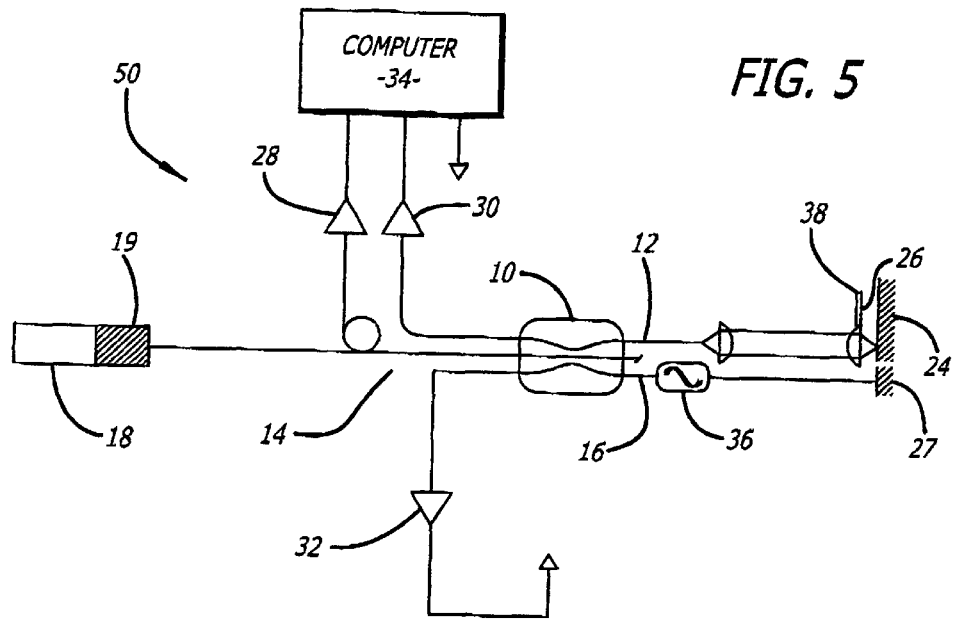
FIG. 5 is a schematic of an embodiment of an interferometer of the present invention.

FIG. 5 shows an embodiment of an optical interferometer 50 of the present invention. The interferometer 50 may include a first waveguide 12, a second waveguide 14 and a third waveguide 16. The waveguides may be fiberoptic cables or integrated waveguides that transmit light.

In this embodiment, one of the waveguides, which for concreteness we shall call the second waveguide 14, may be coupled to a light source 18. By way of example, the light source 18 may be a laser. The light source 18 may have a return isolator 19 that prevents back reflections from feeding back into the source 18. The light emitted from the light source 18 and isolator 19 may be directed into the tri-coupler 10 via an optical circulator 22.

Light entering the tri-coupler 10 along waveguide 14 is distributed to each of the three output waveguides 12, 14 and 16 in roughly equal intensities. Light exiting the tri-coupler on waveguide 14 is allowed to escape the waveguide unused, and the waveguide is terminated in such a way that minimal light is reflected back into the tri-coupler. The light exiting the first waveguide 12 is reflected from an object surface 24 back into the waveguide 12. The interferometer 50 may include a lens assembly 26 and an autofocus system 38 which focuses the light onto surface 24 and back into waveguide 12. Light within the third waveguide 16 may be reflected from a reference surface 27 back into the waveguide 16. The object 24 and reference 27 surfaces may be separate locations of the same test surface. Alternatively, the light from the third waveguide 16 may be reflected from a reference surface (not shown) separate from the object surface 24.

The light reflected from the test surface 24 and reference surface 27 through the first 12 and third 16 waveguides travels back through the tri-coupler 10. The reflected light within the first waveguide 12 provides an object beam. The light within the third waveguide 16 provides a reference beam that interferes with the object beam within the tri-coupler 10.

The tri-coupler 10 will allow reflected light within the first waveguide 12 to be coupled into the second 14 and third 16 waveguides, and reflected light from the third waveguide 16 to be coupled into the first 12 and second 14 waveguides. The output of the tri-coupler 10 is three light beams with intensities that are out of phase with each other by approximately 120 degrees. The light intensity of each light beam is detected by photodetectors 28, 30, and 32. The light exiting the tri-coupler 10 along waveguide 14 is directed to the detector 28 via the circulator 22.

The photodetectors 28, 30, and 32 provide electrical output signals to the computer 34. The computer 34 may have one or more analog to digital converters, processor, memory etc. that can process the output signals.

By way of example, the interferometer 50 can be used to infer the surface profile of a magnetic disk, wherein the test surface 24 is a disk surface. The height at any point can be inferred from the following equation.

$$h = \theta/(4 \cdot \pi \cdot \lambda) \tag{1}$$

where:

h = the apparent height;

θ = the interferometric phase angle between the object and reference beams, and

λ = the wavelength of the reflected light.

The interferometric phase angle can be determined by solving the following three equations.

$$I1 = \alpha 1 \cdot (E1^2 + (\beta 1 \cdot E2)^2 + 2\beta 1 \cdot E1 \cdot E2 \cdot \cos(\theta - \emptyset 1)) \tag{2}$$

$$I2 = \alpha 2 \cdot (E1^2 + (\beta 2 \cdot E2)^2 + 2\beta 2 \cdot E1 \cdot E2 \cdot \cos(\theta - \emptyset 2)) \tag{3}$$

$$I3 = \alpha 3 \cdot (E1^2 + (\beta 3 \cdot E2)^2 + 2\beta 3 \cdot E1 \cdot E2 \cdot \cos(\theta - \emptyset 3)) \tag{4}$$

where;

I1 = the light intensity measured by the photodetector 28;

I2 = the light intensity measured by the photodetector 30;

I3 = the light intensity measured by the photodetector 32;

E1 = the optical field of the light reflected from the test surface into the first waveguide 12;

E2 = the optical field of the light reflected from the reference surface into the third waveguide 16;

Ø1 = the phase shift of the detected light within the first waveguide, this may be approximately −120 degrees;

Ø2 = the phase shift of the detected light within the second waveguide, this may be defined to be 0 degrees;

Ø3 = the phase shift of the detected light within the third waveguide, this may be approximately +120 degrees;

α1 = a channel scaling factor for the first waveguide and detector;

α2 = a channel scaling factor for the second waveguide and detector;

α3 = a channel scaling factor for the third waveguide and detector;

β1 = a coupler nonideality correction term for channel 1;

β2 = a coupler nonideality correction term for channel 2, and

β3 = a coupler nonideality correction term for channel 3.

The interferometer 50 may include a phase shifter 36 that shifts the phase of the light within the third waveguide 16. The phase shifter 36 may be an electro-optic device that can change the phase to obtain a number of calibration data points. The calibration data can be used to solve for the phase shift values Ø1, and Ø3, the channel scaling factors α1, α2, and α3, and the coupler nonideality factors β1, β2, and β3. The values are stored by the computer 34 and together with the measured light intensities I1, I2, and I3 are used to solve equations 1, 2, 3, and 4 to compute the phase angle and the apparent height h.

Figure 6:
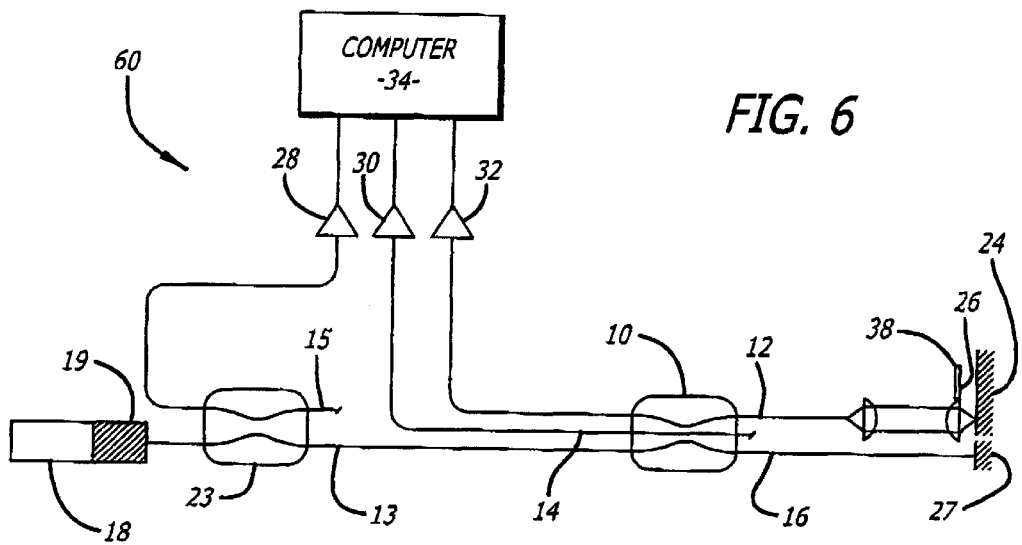
FIG. 6 is a schematic of an alternate embodiment of an interferometer of the present invention.

FIG. 6 shows an alternate embodiment of an optical interferometer 60 of the present invention. The interferometer 60 uses a 2×2 optical coupler 23 in place of the circulator 22 used in interferometer 50. In this case, light from the laser 18 is split as it passes forward through coupler 23. Light exiting coupler 23 along waveguide 15 is dumped. Light exiting coupler 23 in waveguide 13 is fed into tri-coupler 10 as in the interferometer 50 previously discussed. Light returning from tri-coupler 10 along waveguide 13 is split. Light exiting coupler 23 along waveguide 13 is rejected by isolator 19 and does not interfere with the laser. Light exiting coupler 23 along waveguide 15 is fed to detector 28. This embodiment of interferometer 60 is less expensive than that of interferometer 50 owing to the fact that coupler 23 is considerably less expensive than circulator 22. However, the laser power delivered into the tri-coupler 10 is reduced and the signal detected by detector 28 is also reduced as compared to those detected in detectors 30 and 32. In some applications, these facts are inconsequential and the reduced cost of interferometer 60 is preferable.

Figure 7:
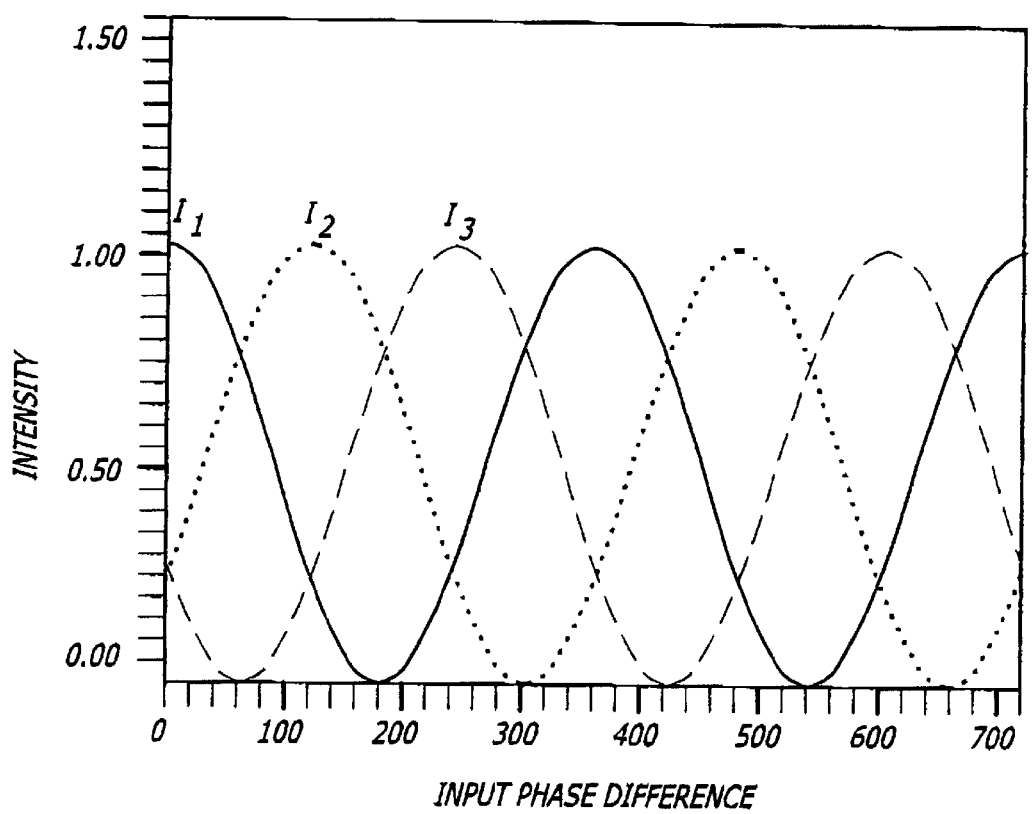
FIG. 7 is a graph showing the output signals from photodetectors on the interferometer versus the input phase-difference between the input beams.

The output signals of the photodetectors 28, 30, and 32, responding to a steadily advancing phase angle at the inputs, are shown superimposed in FIG. 7. The phase shifts between different light beams separates the maxima and minima of the output signals. With such an arrangement at least one of the signals will be in a relatively sensitive portion of the waveform between a maximum and minimum. In this simple way, it can be seen why the present invention provides an interferometric detector that has a relatively uniform sensitivity and is therefore desirable for metrological applications.

Interferometers 50 and 60 of the present invention provide three out-of-phase signals with a minimal number of parts. The tri-coupler 10 and fiberoptic waveguides 12, 14, and 16 can be packaged into a relatively small unit, typically measuring only 0.12" diameter by 2" in length. This reduces the size, weight and cost of the interferometers. By way of example, the tri-coupler 10 and waveguides 12, 14, and 16 could be also constructed onto a single planar substrate using known photolithographic and waveguide fabrication techniques. Such a construction method would have advantageous properties which would allow tighter integration with other portions of the interferometric system together with reduced assembly costs.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, although the light reflected from the test surface 24 is initially directed through the tri-coupler 10, it is to be understood that the light can be introduced to the test surface 24 without initially travelling through the coupler 10.

Although an interferometer for measuring a magnetic disk is described, it is to be understood that the present invention can be used for other interferometric measuring devices which seek to determine the phase relation between two input waves. By way of example, the interferometer can be used to measure vibrations, fly heights (gaps between two surfaces), linear displacements, rotations, as a detector for optical or magnetic data storage e.g. via Kerr effect, pitdepth modulation or other phase sensitive storage mechanisms, or a wide variety of strain sensing applications where rapid readout of the physical parameter of the system is required.

What is claimed is:

1. An apparatus that can measure optical phase variations in or along an object volume or surface with respect to a reference surface comprising:
   a light source that emits light;
   a first waveguide that guides light reflected from the object surface;
   a second waveguide that guides light;
   a third waveguide that guides light reflected from the reference surface;
   a tri-coupler that mixes the reflected light within said first and third waveguides and provides a first output light beam within said first waveguide, a second output light beam within said second waveguide, and a third output light beam within said third waveguide;
   a first photodetector that detects the first output light beam and generates a first output signal;
   a second photodetector that detects the second output light beam and generates a second output signal;
   a third photodetector that detects the third output light beam and generates a third output signal; and
   a controller that receives said first, second, and third output signals and computes a phase difference between the first and third input beams from said first, second and third output signals.

2. The apparatus of claim 1, wherein light intensities of the first, second, and third output light beams are approximately 120 degrees out of phase.

3. The apparatus of claim 1, further comprising a phase shifter coupled to said third waveguide.

4. The apparatus of claim 1, wherein said first, second, and third waveguides each include a fiberoptic cable.

5. The apparatus of claim 1 wherein said phase difference is used to estimate the height and/or reflectivity of surface features on the reflecting substrate.

6. A method for interfering and detecting light, comprising:
   reflecting a first light beam from an object surface;
   reflecting a second light beam from a reference surface;
   coupling the first light beam from a first waveguide to a second waveguide and a third waveguide, and the second light beam from the third waveguide to the first and second waveguides to create a first output light beam in the first waveguide, a second output light beam in the second waveguide, and a third output light beam in the third waveguide;
   detecting the first, second, and third output light beams; and,
   computing a phase angle from the detected first, second, and third output light beams.

7. The method of claim 6, wherein light intensities of the first, second, and third output light beams have light intensities that are approximately 120 degrees out of phase.

* * * * *